Nov. 3, 1953
E. T. BLEECKER
2,657,745
PROCESS OF AND APPARATUS FOR COMBUSTION OF
LIQUID FUEL, VAPORIZATION OF LIQUIDS, AND
MIXING OF GASEOUS FLUIDS
Filed Feb. 24, 1948
4 Sheets—Sheet 1
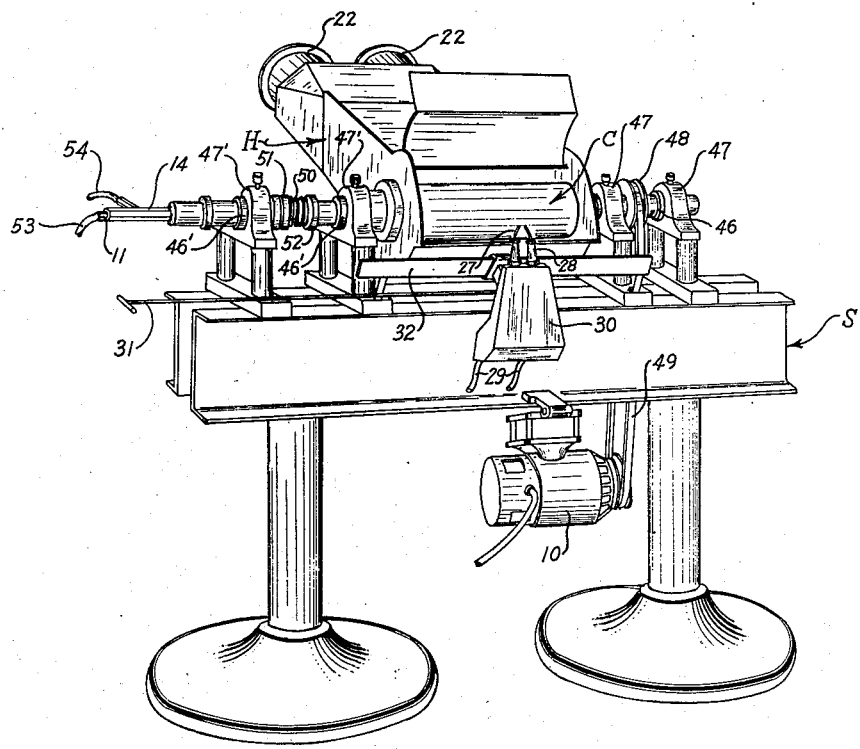
FIG. — 1
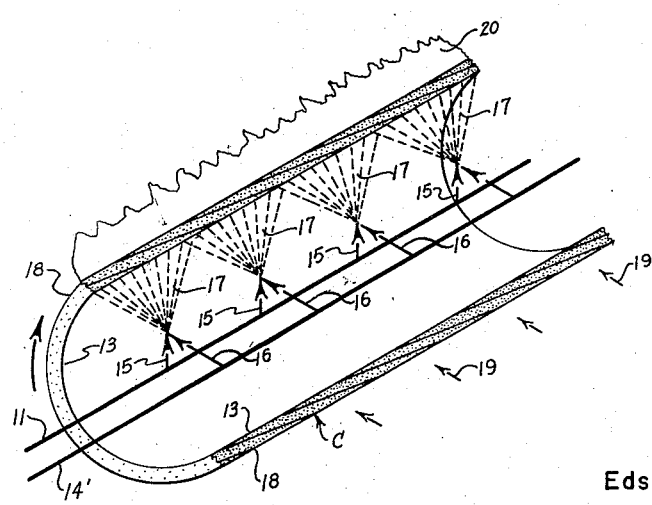
FIG. — 2
INVENTOR.
Edsell T. Bleecker
BY
Lamphere & Van Valkenburgh
ATTORNEYS Nov. 3, 1953
E. T. BLEECKER
2,657,745
PROCESS OF AND APPARATUS FOR COMBUSTION OF
LIQUID FUEL, VAPORIZATION OF LIQUIDS, AND
MIXING OF GASEOUS FLUIDS
Filed Feb. 24, 1948
4 Sheets-Sheet 2
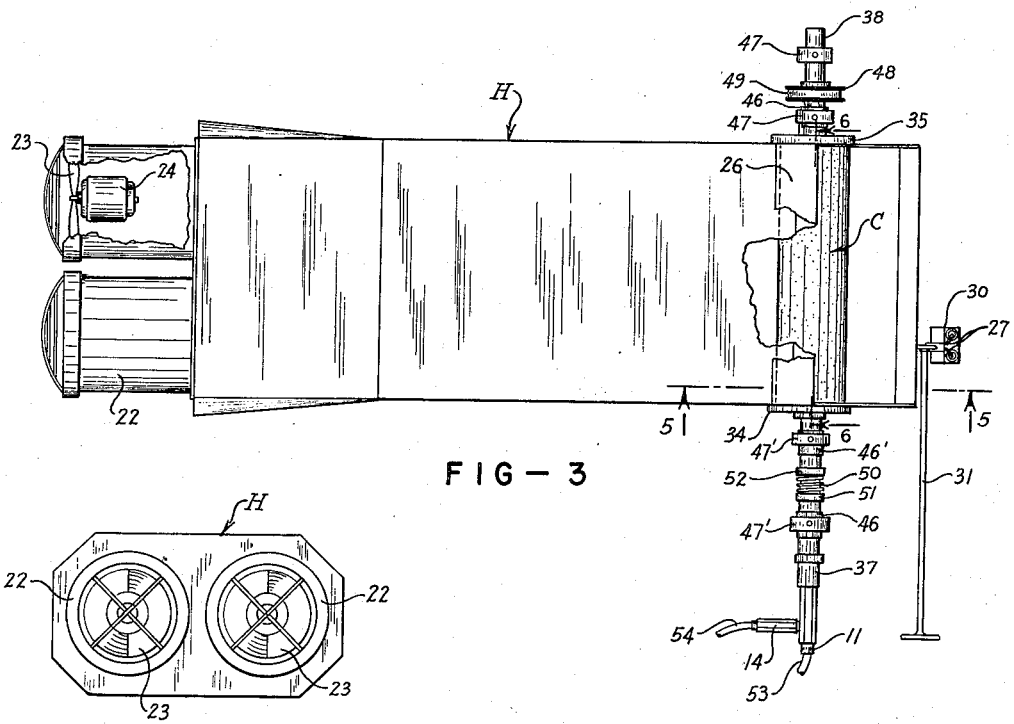
FIG.-3
FIG.-4
FIG.-7
FIG.-8
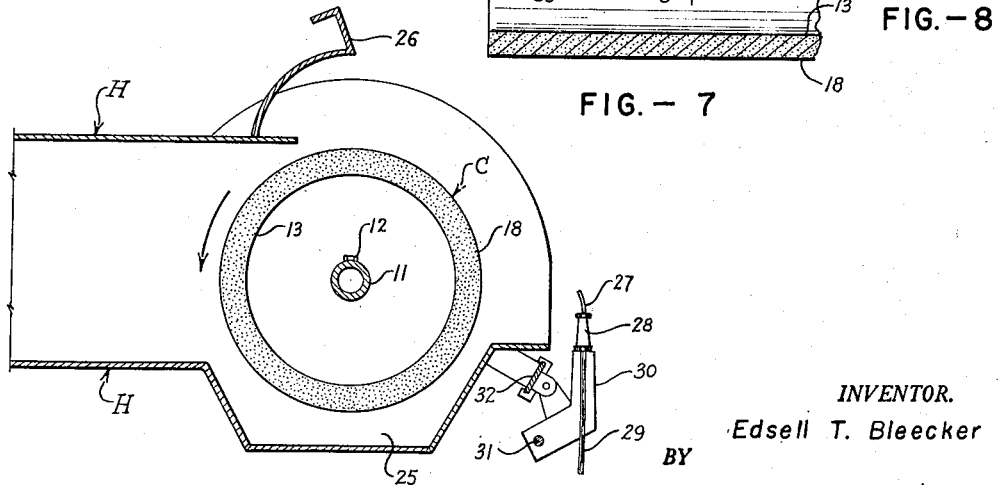
FIG.-5
INVENTOR.
Edsell T. Bleecker
BY Lanphere & Van Valkenburgh
ATTORNEYS

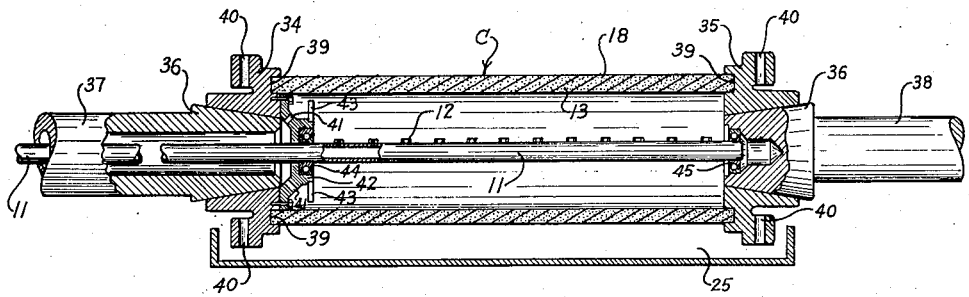
FIG — 6
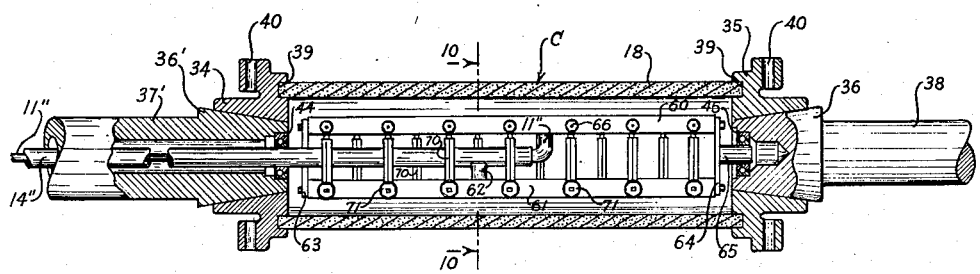
FIG. — 9
FIG. 10
FIG. — 14
INVENTOR.
Edsell T. Bleecker
BY
Lamphere + Van Valkenburgh
ATTORNEYS

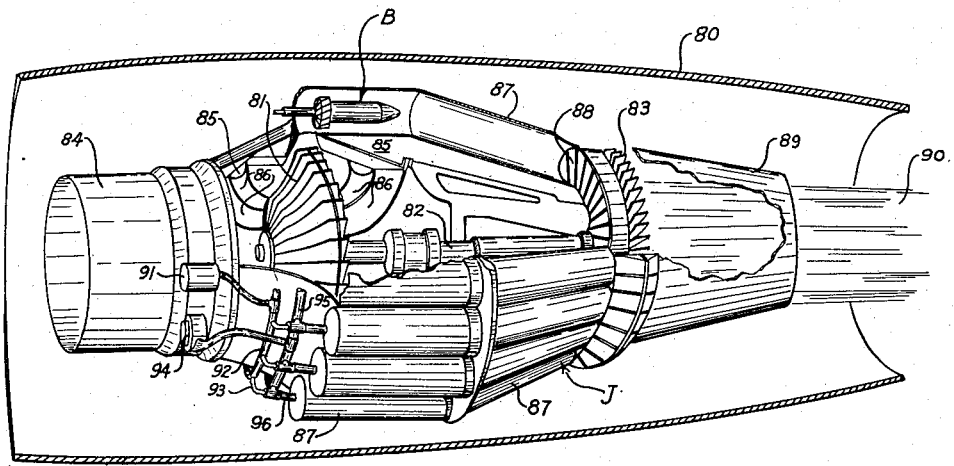
FIG.—11
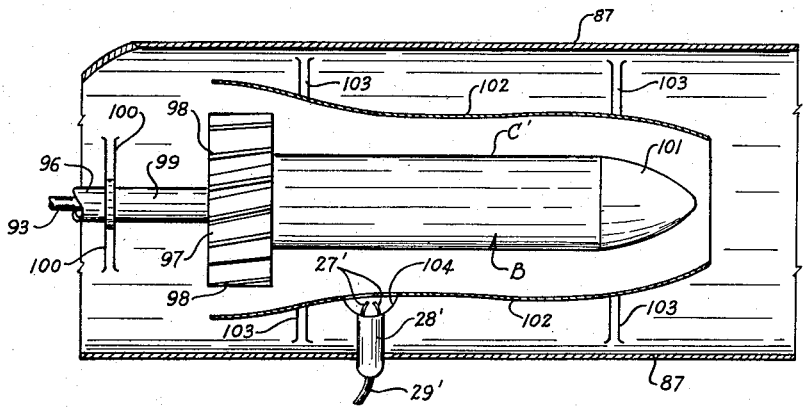
FIG.—12
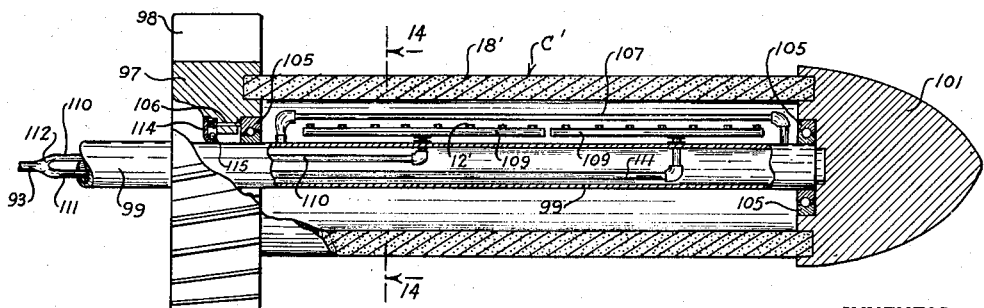
FIG.—13

Patented Nov. 3, 1953

2,657,745

UNITED STATES PATENT OFFICE 2,657,745

PROCESS OF AND APPARATUS FOR COMBUSTION OF LIQUID FUEL, VAPORIZATION OF LIQUIDS, AND MIXING OF GASEOUS FLUIDS

Edsell T. Bleecker, Denver, Colo.

Application February 24, 1948, Serial No. 10,524

25 Claims. (Cl. 158—77)

This invention relates to processes for the combustion of liquid fuels, the vaporization of liquids and the mixing of gaseous and vaporous fluids, one of which is normally or initially a liquid. This invention also relates to apparatus particularly adapted to carry out such processes.

The combustion process of this invention, and the apparatus, such as a burner, particularly adapted to carry out the process, is useful not only in producing heat for heating purposes, but also in apparatus such as gas turbines and jet propulsion engines. The process of vaporizing liquids of this invention is utilized in the combustion process of this invention, but has additional applicability, as in supplying a combustible mixture of gases and vaporous fluids to an internal combustion engine or the like, or producing mixtures of two or more gaseous or vaporous fluids for chemical process and the like.

As used herein, the term "vaporization" or "vaporizing" does not always require complete vaporization or production of the gaseous state, but also includes incomplete vaporization, wherein a portion, perhaps a relatively large proportion, of the liquid being "vaporized" may be produced in the form of a mist. This is normally occasioned by changes in operating conditions, since under some conditions the fluid product may be invisible in bright sunlight and therefore concluded probably to be a true vapor or gas, while changes in the operating conditions may produce a visible fluid product, apparently a mist and therefore concluded to include particles greater than single molecules in size. The term "vaporous fluid" therefore refers to a fluid in a true gas or vapor state, to a mist, or to any proportion of either.

In the attempted mechanical vaporization of liquids, as distinguished from heating or boiling to drive off the vapor, the ultimate object, that of complete vaporization, is seldom achieved. In carburetors for internal combustion engines, for instance, a stream of air passing through a Venturi section picks up and carries along with it liquid fuel, such as gasoline, which is supplied to the Venturi section through small holes or orifices. However, the air tends to carry the fuel or liquid along in the form of small droplets or a mist, rather than in more completely vaporized form. In nozzles for oil burners, the liquid fuel is discharged under pressure through small orifices, but emerges from the nozzle as a spray or stream, which may be broken up into droplets by air currents, but substantially complete vaporization to the gaseous form is seldom produced. Furthermore, the highest combustion efficiency utilizing such nozzles is obtained over only a very small range of fuel consumption. This requires, for instance, that ship boilers be provided with a plurality of burners, so that each can be operated at highest efficiency, and variations in the amount of heat to be produced within the boiler are obtained primarily by shutting off or turning on burners. Also, variation in capacity of the nozzles is obtained efficiently only by changing the size of the orifices. Thus, previous burners utilizing nozzles have been quite limited in capacity variation and also limited in efficiency ranges.

In the gas turbine and jet engine, air is supplied from an axial or radial compressor to one or more burners or combustion spaces, into which the fuel is normally sprayed by a nozzle, the resulting hot gases passing to a gas turbine having one or more stages and driving the compressor directly. In the gas turbine, exhaust is designed for low velocity and at atmospheric or slightly above atmospheric pressure, while the turbine drives an electrical generator or other power using device. In the jet engine, the turbine normally supplies useful work only to the extent required to drive the compressor, while the exhaust gases from the turbine are discharged at relatively high velocity through a special discharge section, in effect a relatively large nozzle, to produce a high velocity jet which provides the thrust required to drive a plane or the like at a normal speed as nearly equal as possible to the velocity of the jet. Due to the many metallurgical and other problems involved, the burner has not received as much attention as the compressor, and particularly the gas turbine. Jet engines are peculiarly susceptible to "blow out," or partial or complete cessation of combustion, which produces many operating difficulties or unreliability. Also, in jet planes, there is an undue time lag between throttle acceleration or increase in fuel supplied to the jet engine, and the actual pick up or increase in power output of the engine. Jet engines are also quite difficult to start, many pounds of fuel often being wasted before combustion continues sufficiently to provide effective operation. In addition, it is normally impossible to restart a jet engine while a jet plane is in flight, so that when a jet plane is coming in to land, after the throttle has been cut, it is necessary to complete the landing, irrespective of emergencies due to changed wind or field conditions. These difficulties have prompted the burner to be called the "Achilles Heel" of a jet engine, since they are occasioned primarily by the inability of present burners to supply an adequately combustible mixture over a wide range and particularly when cold. Thus, there is considerable room for an improved burner, which burner will tend to produce not only greater efficiency over a wider range, but also dependability in operation as well as in starting.

Among the objects of this invention are to provide a novel process of vaporizing liquid or producing vaporous fluid; to provide a novel process of combustion of liquid fuels, which also utilizes such vaporization process; to provide such vaporization and combustion processes which tend to produce substantially complete vaporization of the liquid; to provide such processes which are highly efficient over a relatively wide range of liquid or fuel consumption; to provide apparatus particularly adapted to carry out the above vaporization process; to provide apparatus particularly adapted to carry out the above combustion process; to provide such apparatus which is highly efficient over a wide range of liquid or fuel consumption; to provide such apparatus which may take any one of numerous forms; to provide improved apparatus for liquid vaporization or production of vaporous fluid from a liquid which may be utilized in chemical or physical processes, or for other purposes; to provide apparatus for combustion of liquid fuel which may be utilized as a burner for boilers, heating plants, furnaces, jet engines, and many others; and to provide such combustion apparatus which will be efficient and dependable in starting and in operation.

Additional objects and the novel features of this invention will become apparent from the description which follows.

In accordance with this invention, the process for liquid vaporization may comprise the steps of rotating a foraminous cylinder having interstices, preferably of capillary order, tending to divide and sub-divide liquid passing therethrough, i. e. a hollow body having a substantially cylindrical micro-porous wall or walled portion, and forcefully directing the liquid against the inner surface of the cylinder, as in one or more jets. Such vaporization process may include also the step of supplying air or other gas under pressure to the interior of the rotating cylinder, and/or deflecting the jets to spread them axially of the cylinder's inner surface. The latter may be accomplished by directing jets of air or other gas against the fuel jets, within the cylinder. The process of combustion of a liquid fuel, in accordance with this invention, may include the steps of the above vaporization process, and the additional step of supplying air, oxygen-enriched air, or oxygen, for combustion of the fuel so vaporized. A portion of the air and/or oxygen may be supplied to the interior of the cylinder, under pressure to assist in forcing the liquid through the interstices of the foraminous cylinder.

Additional features of the processes of this invention will become apparent from the following description of apparatus particularly adapted to carry out such processes, taken in connection with the accompanying drawings, in which:

Fig. 1 is a three-dimensional view of a burner or combustion apparatus constructed in accordance with this invention;

Fig. 2 is a diagram or flow chart illustrating the combustion process and the operation of the apparatus of this invention;

Fig. 3 is a top plan view of the apparatus of Fig. 1;

Fig. 4 is a front end or intake view of a portion of the apparatus of Fig. 1;

Fig. 5 is a partial cross section, on an enlarged scale, taken along line 5—5 of Fig. 3;

Fig. 6 is a longitudinal section, on a slightly enlarged scale, taken along line 6—6 of Fig. 3;

Fig. 7 is a partial longitudinal section similar to Fig. 6, with certain parts omitted for clarity and illustrating an alternative construction to that shown in Fig. 6;

Fig. 8 is a partial cross section, on an enlarged scale, taken along line 8—8 of Fig. 7;

Fig. 9 is a longitudinal section, similar to Fig. 6, illustrating a further alternative construction;

Fig. 10 is an enlarged interior cross-section taken along line 10—10 of Fig. 9;

Fig. 11 is a three-dimensional view, partly broken away to show the interior construction, of a jet engine equipped with a burner constructed in accordance with this invention;

Fig. 12 is an enlarged longitudinal section of one combustion chamber of the jet engine of Fig. 11;

Fig. 13 is a further enlarged longitudinal section of the burner or combustion device of Figs. 11 and 12; and Fig. 14 is a cross section taken along line 14—14 of Fig. 13.

Apparatus comprising a burner construction, particularly adapted to carry out the combustion process of this invention, as illustrated in Fig. 1, includes a foraminous cylinder C rotated at a suitable and preferably relatively high speed, such as 4000 to 6000 R. P. M., as by a motor 10, or any other suitable driving means. The liquid to be vaporized, or liquid fuel for combustion, is supplied through a stationary pipe 11, which extends into the interior of the cylinder C, preferably being provided with a plurality of nozzles 12, as in Figs. 5 and 6, adapted to discharge jets or spray of the liquid against the inner surface 13 of the rotating cylinder. A second fluid, such as a gas or another liquid to be vaporized and mixed with the first liquid, or a portion of the air for combustion of the liquid fuel, is also supplied to the interior of the cylinder, as through a stationary pipe 14. The pipe 14 may extend merely to one end of cylinder C, as described in detail later, and supply air under pressure to the interior of the cylinder, which air tends to force the fuel or liquid through the interstices.

The vaporization process of this invention, and also the operation of the apparatus adapted to carry out such process, are illustrated diagrammatically in Fig. 2. As shown therein, the fuel pipe 11 extends within rotating cylinder C, the liquid being discharged as jets in the direction of the arrows 15. Air under pressure is supplied to the interior of the cylinder by air pipe 14', which air pipe may be provided with suitable orifices or nozzles for discharging jets of air in the direction of the arrows 16, such air jets being adapted to deflect and spread the liquid jets to cause sprays 17 of liquid to be forcefully directed against the inner surface 13 of the cylinder C. Such sprays 17 tend to spread axially, so that each spray will cover a greater portion of the interior of the cylinder, the sprays substantially or completely overlapping. Due to the centrifugal force produced by rotation of the cylinder, and also due to the air pressure within the cylinder, the vaporous fluid produced is discharged from the outer surface 18 of the cylinder, and additional air to complete combustion may be supplied in the direction of arrows 19. Depending upon the velocity of such additional air, and other factors such as the pressure within the cylinder C and the relative speed of rotation thereof, the flame 20 may burn relatively close to the cylinder C, as a relatively short flame, or may burn as a relatively short flame in a position spaced from the cylinder C, or a relatively long flame may be produced, close to or spaced from the cylinder.

The amount of air or combustion supporting gas supplied to the interior of cylinder C may be limited for economy, since the air supplied to the interior of the cylinder is normally supplied at a greater pressure than the air or combustion supporting gas supplied exteriorly of the cylinder. Thus, such air may be limited to that necessary to produce an adequate pressure to force the fuel through the interstices of the cylinder. Or, such air may be limited so that the mixture within the cylinder is below the lower limit of inflammability. On the other hand, it has been found that the capacity of the apparatus to vaporize liquid increases to a greater extent upon an increase in the air pressure within the cylinder, than, for instance, an increase in the rate of rotation of the cylinder, so that for dependability and effectiveness in operation, a greater amount of air than would otherwise be indicated may be supplied to the interior of the cylinder.

Another factor possibly affecting the amount of air supplied to the interior of cylinder C, and also the relative amount of air supplied to the exterior thereof, is the physical condition conducive to most complete combustion. Theoretically, the optimum condition for a mixture of fuel and combustion supporting gas would be one in which the molecules of fuel are uniformly spaced, with each fuel molecule surrounded by sufficient molecules of oxygen (air) to combine with the fuel molecule. In this condition, not only will the chemical reaction between the fuel molecule and the oxygen (air) molecules take place readily, but also the reaction will spread at a more uniform rate to adjacent fuel molecules, and relatively fast but even combustion will take place. While the rate of such combustion may approach detonation, the more uniform spacing of the fuel molecules will reduce the tendency toward detonation, since each molecule in turn will combine chemically without a large number igniting substantially simultaneously. Such optimum condition is seldom approached unless complete vaporization, to molecular proportions, is approached, so that it is customary to provide excess oxygen (air) for combustible mixtures. However, excess air tends to produce laminations in flame pattern, due to interference with the spread of combustion by such excess air. Temperature prior to ignition, of course, is a factor in ignition and flame propagation, in general the higher the initial temperature the faster the rate of flame propagation, with a tendency toward more complete combustion. However, with more uniform distribution of fuel molecules and more uniform association of oxygen (air) molecules therewith, the more completely combustion will take place over a limited space, and at lower initial temperatures, i. e. without preheating. One result of more complete combustion is found in the color of the flame, which tends to become blue, with reduction or elimination of white or yellow streaks, the more complete the combustion in a limited space. Thus, the production of a blue flame is indictive of more complete combustion, and a blue flame has been produced with little difficulty with the combustion process and apparatus of this invention. This, in turn, is an indiction of more uniform distribution of fuel molecules and more uniform association of oxygen (air) molecules therewith. Since oxygen (air) is gaseous at normal temperatures and above, it is evident that fuel in the form of vapor (gas) will distribute more evenly into the air, since the relative weight of equal volumes will not differ nearly as greatly as liquid and gas, for instance. The apparent more uniform distribution of fuel, and the apparent more uniform association of oxygen (air) therewith, is evidently due to a more complete vaporization, and the production of a blue flame is an indication that such vaporization apparently approaches molecular proportions.

The cylinder C preferably has a controlled porosity of a suitable value, such as between 3% and 50%, and also preferably has relatively uniform interstices, having as small an average diameter as possible. The cylinder C may be formed of refractory, abrasive or ceramic material, such as alumina, Alundum, silicon carbide, silica, and others. Such cylinders may be formed by ramming together a mixture of particles of the refractory material, and a suitable binder, then firing or baking to produce a bonded structure. A foraminous cylinder used in apparatus constructed in accordance with this invention is 8 in. long, having a 4 in. bore and a 5½ in. O. D., having about 40% porosity, and formed of silicon carbide particles of 46 U. S. Screen Standard with a North Carolina clay binder. (It is also to be noted that satisfactory results may be secured with a cored silicon carbide grinding wheel.) Or, the cylinder C may be made of metal such as steel or iron, the particles or powder of iron or steel, with a binder such as copper, being briquetted or compressed and then heated or sintered to produce a bonded structure. The structure then may be sized in a press or the like, if desired. The particle size as well as the manufacturing steps are preferably controlled so that as uniform interstices as possible are produced. Large spaces or voids, particularly in the outer surface of the cylinder, are to be avoided as far as possible. It will be evident, of course, that other types of materials may be found suitable for various installations, but in general, refractory materials are more suitable for stationary installations where breakage would not be particularly inconvenient, and metal materials are desirable for transportable installations, and particularly those in which shock or other unexpected stresses are likely to occur.

When liquid is directed against the inner surface of the cylinder, it would be expected that, due to centrifugal force, the liquid would be forced through the interstices and that division and sub-division, with consequent vaporization of the liquid, might take place primarily because of such centrifugal force. However, as the liquid droplets become smaller and smaller—assuming that some or all of the liquid may be vaporized before reaching the outer surface 18 of the cylinder C—it will be evident that the centrifugal force acting upon such vapor or vaporous fluid becomes relatively negligible because the weight of that portion of the vapor occupying a relatively small passage or interstice in the cylinder becomes almost negligible. That is, a vapor ordinarily occupies several hundred times the volume which the same weight of liquid would occupy at the same pressure and temperature, so that as the liquid becomes more and more finely divided, the action of centrifugal force appears to become less and less a primary effect. It will be understood, of course, that when the liquid initially impinges against the inner surface, centrifugal force apparently has a relatively considerable effect, so that relatively high speed of rotation of the cylinder is desirable from this standpoint. However, as soon as a minute droplet of liquid becomes vaporized, it must necessarily pass relatively quickly through the remaining interstices of the cylinder, to make way for the additional liquid and/or vapor coming through behind it. It is apparently then that the pressure inside the cylinder has the effect of pushing the vapor or vaporous fluid through, as it were, so that substantially complete vaporization of the liquid may be effected before, or on discharge from, the outer surface of the cylinder. Also, the adhesion of liquid to the walls of the interstices tends to cause the liquid to divide and sub-divide. What effect is produced by the adhesion of vapor molecules to the walls of the interstices is, of course, problematical, but as long as any drops or droplets of liquid exist, adhesion probably contributes to mechanical vaporization. Due to the rate at which the cylinder is rotating, it appears that the molecules of vapor or vaporous fluid leave the cylinder in substantially a tangential direction, although there may be instances in which such direction may be otherwise.

But irrespective of the theoretical explanation, it is evident that merely by rotating a foraminous cylinder or ring at a relatively high speed, and discharging a fluid which is normally a liquid against the inner surface of a cylinder, and also supplying a gas or vapor under pressure to the interior of the cylinder, which gas or vapor may be discharged as jets to deflect the liquid jets and tend to spread them more evenly over the inner surface, and which also may tend to produce an initial sub-division of the liquid, a more complete or substantially complete vaporization of the liquid can be secured. This method of vaporization, and the apparatus therefor described above, may be used in various ways in physical or chemical processes, as well as in burners. For instance, when a gas is to be mixed with a fluid normally a liquid, but which is to be converted to the vapor or vaporous fluid form, the liquid and gas may be discharged into the interior of the cylinder as above. Additional gas may be mixed with the resulting vaporous fluid mixture exteriorly of the cylinder, or the entire amount of gas to be mixed with the vaporous fluid resulting from the liquid may be supplied to the interior of the cylinder. For more adequate mixing, as in the combustion of a normally liquid fuel, the additional air or other combustion supporting gas may be supplied exteriorly of the cylinder, in the manner described above, while in physical or chemical processes or the like, a third gas or vapor or mixture thereof may be mixed with the vapor or mixture emanating from the cylinder. It will be understood, of course, that the number of cylinders may be multiplied in accordance with the number of fluids normally liquid to be vaporized, and also that apparatus of varying capacity may be built which employ a plurality of cylinders, the number of cylinders in operation being proportioned in accordance with the amount of liquid to be vaporized. However, a particular advantage of the vaporization process of this invention lies in the fact that the capacity range of a single cylinder is relatively tremendous. That is, only a small amount of liquid can be adequately vaporized, and the amount of liquid can be increased greatly without seriously affecting the ability of the apparatus to produce substantially complete vaporization.

During increase in rate of liquid flow, some increase in the pressure inside the cylinder may be desirable. However, if a predetermined pressure is maintained within the cylinder, which pressure is sufficient for a considerably greater amount of liquid than may be supplied at a relatively low rate of consumption, the amount of liquid can be increased and all of the increased amount of liquid substantially completely vaporized without difficulty. This means that, in the case of a burner for a jet engine, the pressure within the cylinder may be maintained at or above a predetermined limit, and the amount of fuel varied at will, with assurance that adequate vaporization will take place and that the burner will respond immediately to an increase in the fuel rate. This will produce a corresponding increase in the amount of combustion products, which in turn causes an increase in the amount of hot gases flowing through the turbine and through the jet.

A factor which, in a jet engine or gas turbine, is of benefit in such acceleration, is the ordinary relatively high air-fuel ratio. Thus, a jet engine ordinarily operates not on the theoretical amount of air required for complete combustion of the fuel, or even a 10% or 50% or similar excess of air as in an Otto or diesel cycle engine, but with a much greater amount of excess air, such as up to 200 times that necessary for theoretically complete combustion. The use of such amounts of excess air is occasioned primarily by the fact that the temperature of combustion of the usual jet engine fuel, such as kerosene, is considerably in excess of the temperature which the turbine buckets will withstand, so that the products of combustion are utilized to heat the excess air, which not only reduces the temperature of the hot gases passing to the turbine, but also produces a large volume of heated gases. Thus, when a predetermined pressure is maintained within the cylinder, the amount of excess air is still sufficient at lower speeds to produce complete combustion, particularly when substantial vaporization is accomplished. Also, whenever additional fuel is supplied to the burner, the air pressure within the cylinder is sufficient to insure immediate response in the amount of fuel burned and a resulting increase in the total volume of hot gases produced. As will be evident, when the total amount of hot gases increases, the speed of the turbine will increase, thus resulting in an increase in the amount of air delivered by the compressor and a still further increase in the total amount of hot gases. The response to an increase in fuel supplied to the burner is thus immediate, so that the time lag previously present in jet engines may be overcome.

In addition, due to more nearly complete vaporization, the burner operates efficiently at low capacities as well as high. This is of importance in burners for ships, for instance, wherein previously any variation in the amount of fuel burned could be obtained only by turning on or shutting off nozzles, or changing the metering orifice in one or more nozzles.

In the burner shown in Figs. 1 and 3, combustion air is supplied through a housing H, having at its forward or intake end auxiliary housings 22, as shown also in Fig. 4, and in each of which is installed a blower or fan 23 driven by a motor 24, or in any other suitable manner. The housing H, and other parts as shown, may be mounted on a support S, or installed in a furnace or other equipment. As in Figs. 1 and 3, the exterior air may be directed tangentially, or transversely to the axis of and toward the outer surface 18 of cylinder C, although the additional air may be directed axially of the cylinder so as to envelop the same, while the axis of the rotating cylinder may be horizontal, vertical, or disposed at any desired angle thereto.

As in Fig. 5, cylinder C is preferably rotated into the incoming air stream or other combustion supporting gas containing oxygen, the latter passing underneath the cylinder through a well 25, and the combustible mixture thus produced burning at the opposite side of the cylinder from housing H. Housing H may be provided with a deflecting plate 26 for flame restraining purposes, the latter being omitted, if desired. To ignite the combustible mixture, a pair of electrodes 27 may be mounted in insulators 28, formed of ceramic or the like, the electrodes being connected to a suitable source of electricity by wires 29. Insulators 28 may be mounted on a hinged bracket 30, in turn slidable by means of a rod 31 along a guide 32, so that the electrodes may be tipped upwardly for ignition of the combustible mixture, and then downwardly to a more protected position. When the burner is operating in an enclosed or less accessible space, the electrodes may remain in ignition position at all times.

Referring now to Fig. 6, the ends of cylinders C may be sealed by heads or end rings 34 and 35, interiorly tapered for mounting on the tapered heads 36 of a hollow shaft 37 and a solid shaft 38, respectively. Each end ring 34 and 35 is provided with an inwardly facing, annular slot 39 adapted to receive the respective end of cylinder C, and also may be provided with a circumferential series of balance holes 40, which are adapted to receive balance weights for dynamic balancing. Air supply pipe 14 extends into the interior of hollow shaft 37, suitable rotating seals (not shown) such as including a ring of neoprene or other suitable material, being provided so that the air passes through hollow shaft 37 to the interior of cylinder C, as through holes 41 in a centering ring 42, the latter being provided with a baffle 43 to prevent the air from impinging directly against the jets discharged from fuel nozzles 12. Ball bearings 44 and 45, for which roller bearings or any other suitable type of bearings may be substituted, are mounted on fuel pipe 11 adjacent the ends of the cylinder, the outer race of ball bearing 44 being mounted in centering ring 42 and the outer race of ball bearing 45 being mounted in the end of solid shaft 38. Bearings 44 and 45 maintain pipe 11 in alignment centrally of the cylinder C, and also maintain the cylinder accurately in position during rotation.

Referring now to Figs. 1 and 3, solid shaft 38 rotates in roller or ball bearings 46, one or both of which may also be a thrust bearing, bearings 46 being mounted in standards 47, and a pulley 48 being mounted on shaft 38 between bearings 46 and connected by a V-belt 49 with motor 10. Hollow shaft 37 similarly rotates in bearings 46' mounted in standards 47', while a spring 50 acting between the rotatable race of a thrust bearing 51 and a flange 52 mounted on shaft 37, exerts pressure to clamp cylinder C between end rings 34 and 35. It will be evident that other suitable means for maintaining such pressure may be provided, as by clamping rods or the like extending between the end rings, and also when the cylinder C is made of metal, the end rings may be bolted, welded, or otherwise suitably attached to the ends of the cylinders. A hose 53, connected to a fuel pump or other suitable source of fuel under pressure, preferably controllable, supplies liquid fuel to fuel pipe 11, while an air hose 54 supplies air under pressure to air pipe 14. It will be understood, of course, that, when the apparatus of this invention is utilized merely for vaporization, as in chemical processes or the like, hoses 53 and 54 may supply liquids other than fuel and gas or vapor other than air, respectively.

Instead of merely supplying air under pressure to the interior of the cylinder, the air may be supplied as jets, in accordance with the arrows 16 of Fig. 2, such air jets impinging against and deflecting the liquid jets, preferably so as to spread the jets over a greater area of the inner surface 13 of cylinder C. Such air jets may also tend to break up the liquid jets into smaller drops or particles, thus reducing the amount of division and sub-division necessary within the interstices of the cylinder. For a single row of fuel jets and air jets, a construction similar to that illustrated in Figs. 7 and 8 may be utilized. As shown therein, fuel pipe 11 may extend to a fuel header 55 disposed within the cylinder C and provided with nozzles 12, while air pipe 14', through which fuel pipe 11 extends, may itself extend to a T 56 or similar connection, which may be provided with a packing gland or the like, as shown. An air header 57 leads from T 56, and extends parallel to fuel header 55, but in spaced position relative thereto, preferably slightly above and to one side, as in Fig. 8. A series of orifices 58 may be drilled in air header 57, for discharging air jets against and substantially perpendicularly to the fuel jets discharged from nozzles 12. Of course, the direction of the air jets may be varied as desired, and also nozzles may be substituted for orifices 58. Ordinarily, the orifices 58 will be larger than the orifices in fuel nozzles 12, due to the greater specific volume of a gas or vapor, as compared to liquid.

For additional capacity, the fuel header may be provided with orifices on each side, and corresponding series of air jets may be discharged upwardly toward the fuel jets, the air jets again preferably being directed transverse to the fuel jets. The embodiment illustrated in Figs. 9 and 10 is suitable for such purpose, the cylinder C and heads or end rings 34 and 35, as well as solid shaft 38, being formed as described previously. However, since the air supply pipe 14'' surrounds the fuel pipe 11''' and extends to a point within the cylinder, the centering ring 42 of Fig. 6 may be omitted, and ball bearing 44 mounted on air pipe 14'' and received in the tapered head 36' of hollow shaft 37'. Such positioning of the bearing 44 may also be utilized in the construction of Figs. 7 and 8, described above.

In the embodiment of Figs. 9 and 10, fuel is supplied to an upper box header 60, while air is supplied to a lower box header 61. Fuel pipe 11'' extends through air pipe 14'' to the fuel header 60, while air pipe 14'' may be provided with a T connection 62 leading to air header 61. The headers 60 and 61 may be attached together at the ends, as by a plate 63 at the inner end and a plate 64 at the opposite end, plate 64 being provided with a stub shaft 65 extending into bearing 45. The fuel header 60 is provided with a series of nozzles 66, disposed in spaced position on each side, but alternating to provide a more uniform distribution of fuel, as well as to insure more complete coverage of the interior of the cylinder C. The nozzles 66 are preferably provided with a relatively short, small orifice or discharge passage 67, leading from a larger passage 68, which tends to insure equalization of fuel or liquid pressure at each orifice 67. The nozzles 66 may be threadedly secured in collars 69, in turn inserted in suitable holes drilled in the sides of header 60 and soldered, brazed or otherwise permanently attached to the header. If desired, the nozzles 66 may be threadedly or otherwise attached directly to the header 60.

To provide a more equalized distribution of air to each air nozzle 70, which extends from a hollow block 71 upwardly to a point adjacent the respective fuel nozzle 66, each air collar 72, which is preferably attached permanently to the air header 61, may have a closed inner end and a plurality of holes 73, such as four in number, spaced around the sides thereof. Block 71 may be attached to collar 72 by elongated cap screws 74, which extend to the inner ends of collars 72, being threaded thereinto. As will be evident from Fig. 10, each air nozzle 70 may be provided with a relatively short, small orifice or discharge passage 75 at the upper end, with a larger passage 76 extending the remainder of the length of the nozzle. Preferably, the cross sectional area of passage 76, as well as block 71 and holes 73, is such that substantially full air pressure is present at each orifice 75, so that an equal amount of air will be discharged by each air jet. Also, if desired, fuel collars 69 may be constructed similarly to air collars 72.

It will be evident that the construction shown in Figs. 9 and 10, as well as the rotating cylinder and liquid and gas distribution parts of the apparatus of Figs. 1 and 3 to 8, inclusive, may be utilized in vaporizing a liquid, and for mixing a gas or gases therewith, in carrying out the vaporization process previously described.

The application of the principles of this invention to a jet engine is illustrated by the apparatus shown in Figs. 11 to 14, inclusive. Thus, a jet engine J may be installed within a housing 80, which may be the fuselage or a nacelle and which provides a cooling and insulating air space, as well as a support for mounting the engine. A dual radial compressor 81 is mounted on a shaft 82, driven by a gas turbine wheel 83, while incoming air enters an inlet 84 and passes to manifolds 85, and from the manifolds through channels 86 to each side of the compressor 81. Air discharged from the compressor passes through a plurality of combustion tubes 87, in each of which is installed a burner B constructed in accordance with this invention. The products of combustion, together with additional heated air, pass to the nozzles 88 of the turbine, and the exhaust gases from the turbine are discharged rearwardly through an elongated discharge passage or nozzle 89 to produce the propelling jet 90. Auxiliary equipment may include a gear a separately driven fuel pump 91, the discharge of which is connected to a fuel manifold 92, from which fuel supply tubes 93 lead to each of the burners B. Air compressed to a greater extent than the discharge of compressor 81 may be supplied by a booster compressor, having an intake connected with the discharge of compressor 81, or by a separate compressor 94 designed to supply air at a higher pressure to a manifold 95 and through pipes 96 to the burners B. The compressor 94 may be directly driven by shaft 82, but is preferably separately driven, so that the pressure of air supplied to burner B may be maintained at a minimum, independently of the speed of shaft 82.

In accordance with this invention, as in Fig. 12, each burner B includes a head ring 97 provided with vanes 98 adapted to effect rotation of the burner, through the impingement of the air stream on the vanes 98, the burner rotating about an air pipe 99, which may be supported adjacent the entrance of combustion tube 87 by one or more brackets 100. The burner B also includes a foraminous cylinder C' and a tapered nose 101, the cylinder C' being clamped between head ring 97 and nose 101. In addition, each burner B may be surrounded by a heat transfer shield 102, enclosing a combustion space and adapted to direct air for combustion axially of and around the cylinder C, as well as being adapted to transfer heat to the air flowing around the outside of the shield. After the products of combustion and the air outside the shield have passed the shield, they are mixed in the remaining portion of combustion tube 87, prior to passage through the gas turbine nozzles 88. Shield 102 may be mounted within combustion tube 87 by brackets 103 or the like.

Ignition may be assured by a suitable ignition device, such as comprising a pair of electrodes 27' extending through an insulator 28' formed of a suitable porcelain or other ceramic and connected to a suitable source of electrical current by wires 29'. Insulator 28' may extend through combustion tube 87 and also through shield 102 and into a well 104, at a suitable point to position electrodes 27' adjacent the front end of cylinder C'.

The interior construction of the burner B is shown in Figs. 13 and 14, and may include a pair of thrust bearings 105, one being installed within head ring 97 and the other within nose 101, with a suitable adjustment means such as studs 106, so that the outer race of the thrust bearing 105 in head ring 97 may be adjusted to clamp the cylinder C' securely between the head ring 97 and nose 101. If desired, other clamping means, such as bars or bolts extending between the head or nose, may be utilized. Or, when cylinder C' is made of metal, the cylinder may be bolted directly to either or both head ring 97 and nose 101, or welded, brazed or otherwise solidly attached to one and bolted to the other.

A single air manifold 107, connected at its ends to air supply pipe 99, and provided with a plurality of laterally directed orifices, such as in nozzles 108, is mounted slightly above and to one side of a pair of longitudinally aligned fuel manifolds 109. Each fuel manifold 109 is provided with a series of spaced fuel nozzles 12', each positioned in lateral alignment with one of the air nozzles 108, as in Fig. 14, so that the air jet discharged from each nozzle 108 will deflect and spread the fuel jet discharged from the corresponding fuel nozzle 12'. As in Fig. 13, the fuel manifolds 109 are supplied by fuel supply pipes 110 and 111, respectively, each leading from a T or branch 112, in turn supplied by fuel supply tube 93. As will be evident, the cylinder C', being subjected to little or no resistance to rotation, is readily rotated by the air striking vanes 98, while the highly vaporized fuel discharged from the outer surface 18' of cylinder C', will burn in the space between the burner B and the heat transfer shield 102. The head end of the burner B may be sealed against the escape of air under pressure by one or more sealing rings 114, formed of neoprene or other suitable material, attached to head ring 97 and held against the stationary air pipe 99 by a circular coil spring 115. It will be understood, of course, that a hollow shaft may be utilized in lieu of air pipe 99, and that separarate supply tubes for the compressed air may extend through such a hollow shaft, to the air manifold 107.

As will be evident, due to the effectiveness of the burner B, and particularly its ability to adequately vaporize fuel over a wide range, the jet engine J may be operated at any desired thrust, such as a low thrust, without impairing the dependability of the engine. Particularly when a minimum air pressure is maintained within cylinder C', adequate vaporization can be made to take place, irrespective of the amount of fuel supplied to the burner. Thus, even when the jet engine is cut off, or cut down to what would approximate an idling speed for an internal combustion engine, the engine can be restarted or accelerated substantially immediately merely by increasing the amount of fuel supplied to the burners. Adequate combustion will take place even though the amount of air supplied by compressor 81 when rotating slowly is much less than would normally be required, since the air supplied to the burner is preferably sufficient to support combustion of the vaporized fuel, after discharge from the cylinder C'. Also, there is no tendency for flash back or burning within the cylinder C', since the foraminous character of the cylinder acts to prevent such flash backs.

It will be evident that when the burner B is installed in a jet engine J, the flow of additional air for combustion is axially of the rotating cylinder, rather than transversely to the outer surface thereof. It will be understood, however, that the burner B may be used for heating purposes, as well as in a jet engine, and that the burner constructions previously described, wherein the additional air for combustion is supplied transversely to the axis for the rotating cylinder, may be installed in a jet engine, as by utilizing a tapered but generally cylindrical combustion chamber, and installing a number of such burners in spaced positions about the same, or by providing oval or rectangular combustion chambers, in each of which a foraminous cylinder is rotated about an axis transverse to the direction of air passing through the combustion chamber.

The principles of this invention may also be applied to apparatus similar to a carburetor for an internal combustion engine, the cylinder C or C' being driven directly from the engine and the fuel supplied to the interior thereof by a conventional fuel pump, preferably capable of developing a pressure greater than that normally necessary to supply the usual type of carburetor, in which a fuel reservoir is maintained at a predetermined level by a float controlling an intake valve. Also, a small directly driven fan or blower, or a simple compressor, such as a Roots type, may be utilized to supply air under pressure to the interior of the cylinder C or C'. The air may be discharged through separate jets, or merely supplied to the interior of the rotating cylinder, as desired.

From the foregoing, it will be apparent that the processes and apparatus of this invention fulfill to a marked degree the requirements and objects hereinbefore set forth. The process of liquid vaporization, as indicated previously, is applicable not only to supplying vaporized fuel for combustion purposes, but is also useful in vaporizing and/or mixing gas or vaporous fluid for chemical or physical purposes. The processes and apparatus of this invention provide a high efficiency over a relatively wide range, and also have an inherent range of capacity which insures dependability over a wide range. When applied to a burner, as for industrial or home heating purposes, or to a burner for a jet engine or gas turbine, easy starting, as well as dependability in operation, are assured, since adequate vaporization of the fuel depends not upon the fuel striking a hot plate or baffle, but rather upon the fuel being forced through minute interstices, rotated at a relatively high speed. Thus, vaporization is primarily by virtue of mechanical action, rather than by boiling or heating. It will be understood, of course, that the foraminous cylinder C or C' may be heated by reflection or radiation, and that some vaporization or volatilization may occur due to such heating, without impairing the effectiveness or efficiency thereof. It will also be understood that the foraminous cylinder need not necessarily be a right circular cylinder, but may have other geometrical shape, such as frustroconical, frustro-parabolic, hyperbolic; may have corrugations, convolutions or the like in the inner or outer surface; may vary in thickness or other dimension; may include one or more foraminous section or sections which may be continuous or discontinuous; may in some instances be reciprocated or have other motion, rather than rotative; and may otherwise vary in size, shape, configuration, material, movement, attachment, porosity, pore size, and other attributes, qualities or associations.

Although several different embodiments of the apparatus of this invention have been described and illustrated, it will be understood that other embodiments may exist, and that various changes may be made in the embodiments described and other embodiments, all without departing from the spirit and scope of this invention.

What is claimed is:

1. In apparatus for the combustion of a normally liquid fuel, a hollow cylinder having a micro-porous wall whose interstices tend to divide and sub-divide fluid passing therethrough; means for rotating said cylinder about its longitudinal axis; means including at least one nozzle disposed in the interior of said cylinder for directing said fuel against successive circumferential portions of substantially the entire inner surface of said micro-porous wall; conduit means extending within said cylinder for supplying said fuel to said fuel directing means; means for supplying a combustion supporting gas under pressure to the interior of said cylinder; and means for sealing the ends of said cylinder.

2. Apparatus for the vaporization of a liquid, comprising a hollow cylinder having a micro-porous wall whose interstices tend to divide and sub-divide fluid passing therethrough; means for rotating said cylinder about its longitudinal axis; at least one liquid nozzle disposed in the interior of said cylinder for directing a jet of said liquid toward successive circumferential portions of the inner surface of said cylinder; means for sealing the ends of said cylinder, conduit means extending within said cylinder for supplying said liquid to each said liquid nozzle; second conduit means extending within said cylinder for supplying a normally gaseous fluid under pressure to the interior of said cylinder; and at least one gas nozzle connected with said gas conduit means and positioned to direct a gas jet or jets for deflecting said liquid jet or jets to cause the latter to spread and impinge against substantially the entire area of the inner surface of the micro-porous wall of said cylinder.

3. In apparatus for the combustion of a normally liquid fuel, a sealed hollow cylinder having a micro-porous wall whose interstices tend to divide and sub-divide fluid passing therethrough; means for rotating said cylinder about its longitudinal axis; an upper fuel header and a lower combustion supporting gas header beneath said fuel header, said headers being disposed longitudinally in the interior of said cylinder; a plurality of fuel nozzles mounted on each side of said fuel header for directing said fuel toward successive circumferential portions of the inner surface of said cylinder; a plurality of nozzles mounted on opposite sides of said gas header, each said gas nozzle extending upwardly toward a fuel nozzle and adapted to direct a deflecting jet of gas against the fuel jet issuing from the corresponding fuel nozzle and to distribute said fuel over substantially the entire inner surface of said micro-porous wall; means for supplying fuel to said fuel header; and means for supplying a combustion supporting gas to said gas header at a rate sufficient to pressurize the interior of said cylinder.

4. In a jet engine or the like, a combustion tube; a sealed hollow cylinder having a micro-porous wall whose interstices tend to divide and sub-divide fluid passing therethrough, said cylinder being mounted in said tube for rotation about the longitudinal axis of said cylinder; means for supplying fuel to the interior of said cylinder and directing said fuel against substantially the entire inner surface of said micro-porous wall; means for supplying a portion of the combustion supporting gas under pressure to the interior of said cylinder and means for supplying the remainder of the combustion supporting gas to said combustion tube and exteriorly of said cylinder.

5. In a jet engine, a combustion tube, rotatably mounted cylinder, fuel supplying and directing means, and combustion supporting gas supplying means, as defined in claim 4, and a combustion and heat transfer shield generally surrounding said cylinder and spaced from said combustion tube.

6. In a jet engine, a combustion tube, rotatably mounted cylinder, fuel supplying and directing means, and combustion supporting gas supplying means, as defined in claim 4, and including means for rotating said cylinder comprising a plurality of vanes against which combustion supporting gas in said tube impinges.

7. In a jet engine, the improvement defined in claim 6, wherein said cylinder is mounted for rotation about an axis extending generally longitudinally of said tube, and said cylinder is mounted between a head provided with said vanes at the upstream end and a tapered nose at the downstream end.

8. In a jet engine or the like, a combustion tube; a sealed hollow cylinder having a micro-porous wall whose interstices tend to divide and sub-divide fluid passing therethrough, said cylinder being mounted in said tube for rotation about the longitudinal axis of said cylinder; a stationary fuel manifold extending longitudinally in said cylinder; a stationary air manifold extending longitudinally in said cylinder and in spaced, parallel relation to said fuel manifold; a plurality of nozzles mounted on said fuel manifold for directing jets of fuel toward successive circumferential portions of the inner surface of said cylinder; a plurality of nozzles mounted on said air manifold, said nozzles being disposed so that at least one air nozzle directs air against the jet from each fuel nozzle to spread said fuel jets and distribute said fuel over substantially the entire inner surface of said micro-porous wall; means for supplying fuel to said fuel manifold; and means for supplying air to said air manifold at a rate sufficient to pressurize the interior of said cylinder.

9. Apparatus for the combustion of a normally liquid fuel, comprising a sealed hollow cylinder having a micro-porous wall whose interstices tend to divide and sub-divide fluid passing therethrough; a liquid fuel supply tube extending to the interior of said cylinder; means including a plurality of nozzles on said liquid supply tube for discharging said liquid against substantially the entire inner surface of said micro-porous wall; a hollow tube surrounding said liquid supply tube, for supplying air to the interior of said cylinder; blower means for supplying additional air to the exterior of said cylinder; a housing encompassing said cylinder and extending transversely to the axis thereof, said blower means being mounted at the end of said housing opposite said cylinder; means for rotating said cylinder including end rings for clamping said cylinder therebetween; resilient means for maintaining said end rings clamped against said cylinder; and an ignition device adjacent said cylinder for igniting the combustible mixture.

10. In apparatus for the combustion of a normally liquid fuel, a sealed hollow cylinder having a micro-porous wall whose interstices tend to divide and sub-divide fluid passing therethrough; a pair of end rings for clamping said cylinder therebetween, each end ring having a tapered central aperture and an annular groove on the inner face thereof, said groove being adapted to receive the end of said cylinder; a shaft having a tapered head extending axially into each said end ring, one said shaft having at the inner end thereof a central concavity for receiving a bearing, and the other said shaft being hollow; a liquid fuel supply tube extending through said hollow shaft and axially within said cylinder and provided at its terminal end with a bearing received in said concavity; a bearing support mounted within said cylinder and attached to said end ring at said hollow shaft, said bearing support being provided with a bearing for said liquid supply tube and having apertures therein to permit air to flow from said hollow shaft to the interior of said cylinder; and a plurality of nozzles mounted on said liquid supply tube within said cylinder, for discharging jets of liquid fuel toward the inner surface of said cylinder, said bearing support having projections for deflecting the air passing through said apertures, to prevent the axial impingement thereof on said fuel jets.

11. In apparatus for the combustion of a normally liquid fuel, a sealed hollow cylinder having a micro-porous wall whose interstices tend to divide and sub-divide fluid passing therethrough; a pair of end rings for clamping said cylinder therebetween, each end ring having a tapered central aperture and an annular groove on the inner face thereof, said groove being adapted to receive the end of said cylinder; a shaft having a tapered head extending axially into each said end ring, each said shaft having at the inner end thereof a central concavity for receiving a bearing and one said shaft being hollow; a liquid supply tube extending through said hollow shaft and axially within said cylinder and provided at the solid shaft end with a bearing received in said concavity; a combustion supporting gas tube surrounding said liquid supply tube and extending within said hollow shaft to the interior of said cylinder and provided at the hollow shaft end with a bearing received in said concavity; a manifold extending longitudinally within said cylinder in spaced, generally parallel relation to said liquid supply tube; and a plurality of nozzles mounted on said liquid supply tube within said cylinder, for discharging jets of liquid fuel toward the inner surface of said cylinder, said combustion supporting gas tube having orifices for directing jets impinging laterally against said fuel jets.

12. In apparatus for the combustion of a normally liquid fuel, a sealed hollow cylinder having a micro-porous wall whose interstices tend to divide and sub-divide fluid passing therethrough; a pair of end rings for clamping said cylinder therebetween, each end ring having a tapered central aperture and an annular groove on the inner face thereof, said groove being adapted to receive the end of said cylinder; a shaft having a tapered head extending axially into each said end ring, each said shaft having at the inner end thereof a central concavity for receiving a bearing, and one said shaft being hollow; a fuel supply tube and an air supply tube extending through said hollow shaft concentrically and axially into said cylinder, said tubes being provided at said hollow shaft end with a bearing received in said concavity; an upper fuel manifold and a lower air manifold, each said supply tube connecting with the respective manifold; end plates connecting said manifolds, one said plate being connected to said supply tubes and the other said plate being provided with a stub shaft for a bearing received in the other concavity; a plurality of nozzles mounted on opposite sides of said fuel manifold, for discharging jets of liquid fuel toward the inner surface of said cylinder; and a plurality of nozzles mounted on opposite sides of said air manifold for directing air jets upwardly against said fuel jets.

13. In apparatus for the combustion of a normally liquid fuel, a sealed hollow cylinder having a micro-porous wall whose interstices tend to divide and sub-divide fluid passing therethrough; means for closing the ends of said cylinder; a fuel supply tube and an air supply tube extending to the interior of said cylinder; an upper fuel manifold and a lower air manifold extending longitudinally within said cylinder, said supply tubes connecting with the respective manifold; a plurality of nozzles mounted in alternating relation on opposite sides of said fuel manifold within said cylinder, for discharging jets of liquid fuel laterally toward the inner surface of said cylinder, each said fuel nozzle having an enlarged bore and a relatively short discharge orifice; a plurality of blocks mounted on said air manifold in alternating relation on opposite sides thereof, each said block having a bore communicating with the interior of said manifold; and a plurality of air nozzles extending upwardly from said blocks to a point adjacent and beneath said fuel nozzles, each said air nozzle having a relatively short orifice and an enlarged bore communicating with the bore in said block, the cross-sectional area of the air passage between the interior of said manifold and said nozzle orifice being sufficiently greater than the area of said orifice that a substantially uniform pressure tends to be maintained at each said orifice.

14. Apparatus for the combustion of a normally liquid fuel, adapted for use in a jet engine or the like, comprising a hollow cylinder having a micro-porous wall whose interstices tend to divide and sub-divide fluid passing therethrough; a liquid fuel supply tube and a combustion supporting gas supply tube extending to the interior of said cylinder; means associated with said liquid supply tube for discharging jets of fuel toward the inner surface of said cylinder; means associated with said gas supply tube for supplying air to the interior of said cylinder; means for closing the ends of said cylinder, including a tapering nose and a head provided with vanes for effecting rotation of said cylinder, said head and nose each having an annular groove adapted to receive the respective end of said cylinder; bearings mounted on said supply tubes and in said head and nose for rotation of said cylinder, head and nose, while said supply tubes and fuel-discharge and air-supply means remain stationary relative thereto; and means for sealing the interior of said cylinder and associated with said head, including a sealing ring mounted on said head and a coil spring for maintaining said ring in contact with one of said supply tubes.

15. In a process for the combustion of a normally liquid fuel, the steps which comprise forcefully directing said fuel against substantially the entire inner surface of a micro-porous wall portion of a sealed, rotating hollow body having a substantially cylindrical micro-porous wall portion concentric to the axis of rotation of said body; supplying a portion of the combustion supporting gas under pressure to the interior of said rotating body to cause division and subdivision of fuel passing through the micro-porous walled portion thereof; and supplying the remainder of the combustion supporting gas exteriorly of said body in mixing relation to the fuel discharged therefrom.

16. In a process for the combustion of a normally liquid fuel, as defined in claim 15, including forcefully directing a plurality of jets of said fuel toward the inner surface of said cylindrical micro-porous walled portion of said body.

17. In a process for the combustion of a normally liquid fuel, as defined in claim 16, the additional step of deflecting each said jet to cause the liquid of said jet to discharge as a spray against a portion of the inner surface of the micro-porous walled portion of said body.

18. In a process for the combustion of a normally liquid fuel, as defined in claim 17, which includes directing a portion of such combustion supporting gas against said fuel jets to deflect the same.

19. In a process for the combustion of a normally liquid fuel, as defined in claim 15, wherein at least a portion of said combustion supporting gas is directed transversely to the axis of and toward the outer surface of said cylinder.

20. In a process for the combustion of a normally liquid fuel, as defined in claim 15, including directing at least a portion of said combustion supporting gas axially of and around the outer surface of said cylinder.

21. In a process for the vaporization of a liquid, the steps which comprise rotating a sealed hollow body having a substantially cylindrical micro-porous walled portion concentric to the axis of rotation of said body; forcefully directing said liquid against substantially the entire inner surface of said micro-porous walled portion; and supplying a normally gaseous fluid under pressure to the interior of said sealed body.

22. In apparatus for the vaporization of a liquid, a sealed hollow body having a substantially cylindrical micro-porous walled portion; means for rotating said body about the axis of said cylindrical portion; means for forcefully directing said liquid against substantially the entire inner surface of said micro-porous walled portion; and means for supplying a normally gaseous fluid under pressure to the interior of said sealed body.

23. In apparatus for the combustion of a normally liquid fuel, a sealed, hollow body having a substantially cylindrical micro-porous walled portion; means for rotating said body about the longitudinal axis of said cylindrical micro-porous walled portion; means including at least one nozzle disposed in the interior of said body for directing said fuel against successive circumferential portions of substantially the entire inner surface of said cylindrical micro-porous walled portion; conduit means extending within said body for supplying said fuel to each said nozzle; means for supplying a portion of the combustion supporting gas for the fuel to the interior of said rotating body to cause division and subdivision of fuel passing through the micro-porous walled portion thereof; and means for supplying the remainder of the combustion supporting gas exteriorly of said body in mixing relation to the fuel discharged therefrom.

24. In apparatus for the combustion of a normally liquid fuel, as defined in claim 23, including means for supplying said exterior combustion supporting gas transversely to the axis of and toward the outer surface of said body.

25. In apparatus for the combustion of a normally liquid fuel, as defined in claim 23, including means for supplying said exterior combustion supporting gas axially of and around the outer surface of said body.

EDSELL T. BLEECKER.

References Cited in the file of this patent

UNITED STATES PATENTS

| Number | Name | Date |
|---|---|---|
| 404,428 | Paine | June 4, 1889 |
| 548,647 | Mack | Oct. 29, 1895 |
| 1,026,227 | Schmidt | May 14, 1912 |
| 1,184,659 | Ray | May 23, 1916 |
| 1,592,238 | Walker | July 13, 1926 |
| 1,621,092 | Toffteen | Mar. 15, 1927 |
| 1,631,374 | Inglis | June 7, 1927 |
| 1,674,631 | Benniger | June 26, 1928 |
| 1,691,827 | Schuckher | Nov. 13, 1928 |
| 2,030,123 | Tiffany | Feb. 11, 1936 |
| 2,108,872 | Swallow | Feb. 22, 1938 |
| 2,397,230 | Armathes | Mar. 26, 1946 |
| 2,405,785 | Goddard | Aug. 13, 1946 |
| 2,417,929 | Hanson | Mar. 25, 1947 |

FOREIGN PATENTS

| Number | Country | Date |
|---|---|---|
| 24,769 | France | June 26, 1922 |